Jan. 19, 1937. J. F. CRAIG 2,068,376
SAFETY CAR EQUIPMENT
Filed March 12, 1935
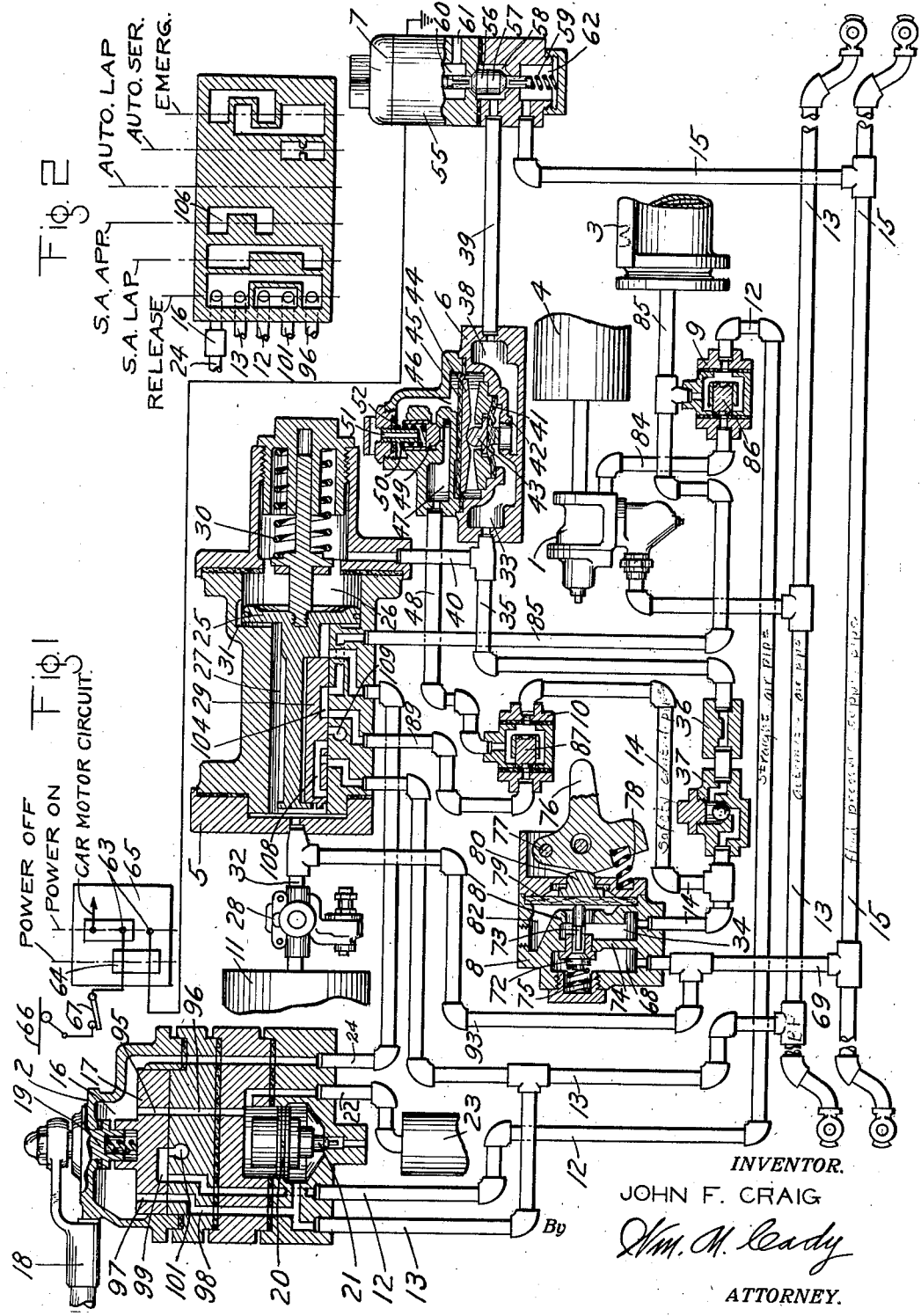
INVENTOR.
JOHN F. CRAIG
By Wm. M. Cady
ATTORNEY.

Patented Jan. 19, 1937

2,068,376

UNITED STATES PATENT OFFICE 2,068,376

SAFETY CAR EQUIPMENT

John F. Craig, Upper Montclair, N. J., assignor to The Westinghouse Air Brake Company, Wilmerding, Pa., a corporation of Pennsylvania Application March 12, 1935, Serial No. 10,647

18 Claims. (Cl. 303—19)

This invention relates to fluid pressure brakes, and particularly to safety car control equipment effective to cause an application of the brakes in the event of incapacitation of the car operator.

One object of my invention is to provide a brake controlling equipment in which electrically controlled means and fluid pressure controlled means cooperate to cause an application of the brakes in the event of incapacitation of the operator.

Another object of the invention is to provide a brake controlling equipment in which electrically controlled means is effective upon the release of the car motor controller handle to cause an application of the brakes, unless a foot valve device is conditioned in a predetermined manner or unless a predetermined degree of braking force is already in effect.

Other objects and advantages of my invention will be made apparent in the following detailed description thereof, when read in connection with the accompanying drawing, wherein Fig. 1 is a diagrammatic view, principally in section, of an illustrative embodiment of my invention, the several parts of the equipment being shown in normal running position; and Fig. 2 is a development view showing diagrammatically the connections established in the various operating positions of the brake valve device.

As shown in the drawing, the brake controlling equipment comprises a triple valve device 1 for controlling the automatic application and release of the brakes, a combined automatic and straight air brake valve device 2, a brake cylinder 3, an auxiliary reservoir 4, an application valve device 5, a cut-off valve device 6, an electro-responsive magnet valve device 7, and a foot valve device 8. The equipment also comprises the double check valve devices 9 and 10, a main reservoir 11, a straight air pipe 12, a brake pipe 13, a safety control pipe 14, and a fluid pressure supply pipe 15.

The triple valve device 1 is of the usual construction and is operated in the usual manner upon a reduction in pressure in the brake pipe 13 to effect an automatic application of the brakes by supplying fluid under pressure from the auxiliary reservoir 4 to the brake cylinder 3, and upon an increase in brake pipe pressure to effect the automatic release of the brakes.

The brake valve device 2 is of the usual well-known type having positions in which the brakes may be controlled directly by straight air and other positions for automatically controlling the brakes by varying the pressure of fluid in the brake pipe 13. The brake valve device comprises a casing having a chamber 16 containing a rotary valve 17 which is adapted to be operated by a handle 18 connected to said rotary valve through an operating stem 19. The brake valve casing also contains the usual equalizing piston 20 and discharge valve 21 adapted to be operated by said piston in the usual manner to effect a reduction in brake pipe pressure during an automatic application of the brakes.

The brake valve device is connected to the straight air pipe 12, the brake pipe 13, the pipe 22 leading to the usual equalizing reservoir 23, and the car control pipe 24 leading to the application valve device 5, through which said brake valve device is adapted to be supplied with fluid under pressure, as will be understood from the description hereinafter.

The application valve device 5 comprises a piston 25 having at one side a chamber 26 and at the opposite side a chamber 27 which is supplied with fluid under pressure from the main reservoir through a feed valve device 28 of the usual construction and a pipe 32. A slide valve 29 is contained in the chamber 27 and is adapted to be operated by the piston 25. A coiled spring 30 contained in chamber 26 acts to urge the piston 25 and slide valve 29 to the normal position shown in the drawing, in which a feed groove 31 in the casing around said piston is uncovered.

The cut-off valve device 6 comprises a casing having a chamber 33 which is connected through a pipe 40 to the piston chamber 26 of the application valve device 5 and to a chamber 34 in the foot valve device 8 by way of a pipe 35 containing a choke fitting 36 and a non-return check valve device 37, said check valve device being arranged to prevent flow of fluid under pressure from the chamber 33 to the chamber 34 for a purpose which will be made apparent hereinafter. The casing also has a chamber 38 which is connected through a pipe 39 with the magnet valve device 7. Communication between the chambers 33 and 38 is controlled by a flexible diaphragm 41 mounted in the casing. This diaphragm serves as a valve and the under side thereof is adapted to seat on a seat ring 42 to close communication between the chambers 33 and 38. Engaging the other side of the diaphragm 41 is a follower member 43, the upper end of which is engaged by a follower plate 44 in engagement with the under side of a flexible diaphragm 45 mounted in the casing.

The casing of the cut-off valve device 6 also contains a chamber 46 formed at the upper side of diaphragm 45 and a chamber 47 connected to the double check valve device 10 through a pipe 48. Communication between chambers 46 and 47 is cut off by a valve piston 49, which is urged in one direction by a spring 50, so that one end thereof, which is formed as a valve, seats on a cooperating valve seat, chamber 46 being simultaneously open to atmosphere past the unseated opposite end of the valve piston and through a passage 51. When the pressure of fluid supplied to chamber 47 through pipe 48, as hereinafter described, attains a predetermined value, such as for example, thirty-five pounds, it exerts a sufficient degree of force to overcome the spring 50, and raises valve piston 49 so that the said opposite end thereof seats on an annular gasket seat 52 to close off the communication between chamber 46 and the atmosphere through passage 51, and so that the said one end is unseated to open the communication between chambers 46 and 47. The pressure of fluid supplied past valve piston 49 to chamber 46, as determined by the tension of spring 50, is such that the downward force exerted thereby on diaphragm 45 urges diaphragm 41 into seated relation on its seat 42 to close off the communication between chambers 38 and 33.

The magnet valve device 7 comprises a magnet or magnet coil 55 and oppositely seating valves 56 and 57 operated by the magnet and disposed in a chamber 58 connected to the chamber 38 of the cut-off valve device 6 through pipe 39. The valves 56 and 57 are biased upwardly by a spring 59 into seated and unseated positions, respectively, when the magnet is deenergized, and are moved downwardly against the force of spring 59 into unseated and seated positions, respectively, when the magnet is energized. Valve 56 controls communication between chamber 58 and a chamber 60 constantly open to atmosphere through a port 61, and valve 57 controls communication between chamber 58 and a chamber 62 constantly connected to the fluid pressure supply pipe 15.

The magnet 55 is controlled by means of a switch device operated by the motor-controller 65, the switch device being shown diagrammatically as comprising contact terminals 63 and a bridging member 64, but being of any suitable construction such that it completes a circuit for energizing the magnet in the power-off position of the motor-controller 65 and opens the circuit for the magnet when the motor controller is in power-on position. The motor controller 65 is of the type that is automatically returned to power-off position when the operating handle (not shown) thereof is released by the operator. Any suitable source of supply for the magnet may be provided, such as the trolley wire 66, as shown, or a battery. A reset switch or circuit breaker 67 is provided for controlling the circuit of the car motor and the circuit of the magnet valve device 7, and is adapted when in open position to effect deenergization of magnet valve device 7 while the motor controller is in power-off position, as when the car is being housed, and also to prevent starting of the car by operation of the motor controller.

The foot valve device 8 comprises a casing having a chamber 68 constantly connected to the fluid pressure supply pipe 15 through a branch pipe 69, and includes a valve 72 disposed in chamber 68 and controlling communication between chamber 68 and chamber 34. Valve 72 has a fluted stem 73, which projects slidably through a wall 74 into chamber 34, and is urged into seated relation on its valve seat on the wall by a spring 75. The foot valve device 8 is provided with a foot pedal 76, which is pivotally mounted on a pin 77 formed on or secured to the casing, so that when the pedal is depressed, it causes the valve 72 to be unseated against the force of spring 75, a spring 78 being interposed between the pedal and the casing to bias the pedal outwardly when not depressed, to permit valve 72 to be seated. Interposed between the pedal 76 and the end of the valve stem 73 is a flexible diaphragm 79 suitably mounted in the casing, and having a follower 80 at one side thereof which follower is engaged by the pedal 76, the opposite side of the diaphragm being adapted to engage the end of the valve stem 73. The diaphragm 80 is adapted, when flexed inwardly by the pedal 76 to seat on a valve seat 81 and thus, simultaneously with the unseating of valve 72, to close the communication between chamber 34 and an atmospheric chamber or passage 82 in the casing.

The double check valve device 9 is of well known construction and comprises a casing to which the straight air pipe 12, a pipe 84 leading to the brake cylinder passage of the triple valve device 1, and a pipe 85 leading to the brake cylinder 3 are connected, a valve 86 contained in the casing and shiftable by fluid pressure, in the usual manner, between two extreme positions, being adapted to control connections between the brake cylinder and pipes 84 and 12, as described hereinafter.

Double check valve device 10 is identical in construction with check valve device 9, and comprises a valve 87 adapted to control connections between pipe 48 connected to the cut-off valve device 6, and safety control pipe 14 and a pipe 89 connected to the application valve device 5 as described hereinafter.

In operation, with the brake valve handle 18 in release position, the pedal 76 of the foot valve device 8 released, the switch 67 open, and the motor controller device 65 in power-off position, the equipment is initially charged by fluid under pressure supplied to the main reservoir 11 in the usual manner, which flows to piston chamber 26, through feed valve device 28, pipe 32, branch pipes 93 and 69, fluid pressure supply pipe 15, chamber 62 of the magnet valve device 7, past the unseated valve 57, through chamber 58, pipe 39, chamber 38 of the cut-off valve device 6, past the unseated valve diaphragm 41, through chamber 33, pipe 35, and branch pipe and passage 40. Obviously, since chamber 46 of the cut-off valve device 6 is open to atmosphere past the unseated end of valve piston 49 and through passage 51, valve diaphragm 41 is free to flex upwardly to the unseated position shown. It will be observed that check valve 37 prevents flow of fluid under pressure past the piston chamber 26 to atmosphere by way of pipe 35 and the atmospheric exhaust passage 82 of the foot valve device 8.

Fluid under pressure is also supplied from the main reservoir 11 directly to valve chamber 27 of the application valve device 5 through feed valve device 28 and pipe 32, and the pressures on opposite sides of the piston 25 being thus equalized, spring 30 maintains the piston 25 and slide valve 29 in the position shown, wherein the feed groove 31 around the piston 25 is open to maintain equalization of pressures on opposite sides of piston 25 should the pressure in chamber 26 reduce due to leakage.

In this position of the application slide valve 29 and with the brake valve device 2 in release position, as shown in Fig. 1, fluid under pressure is supplied from the feed valve device 28 to the rotary valve chamber 16 of brake valve device 2 through valve chamber 27, and passage and pipe 24, and from chamber 16 to the upper side of the equalizing piston 20 and the equalizing reservoir 23 which is thus charged to feed valve pressure through a port 95 in the rotary valve 17 and a passage 96. Fluid under pressure is also supplied from chamber 16 to the lower side of equalizing piston 20 and to the brake pipe 13, which is thus charged to feed valve pressure, through a port 97 in the rotary valve and a passage 98.

Upon charging of the brake pipe 13, the piston of the triple valve 1 is shifted to release position and the auxiliary reservoir 4 charged to feed valve pressure in the usual manner through the feed groove around the triple valve piston (not shown).

When the double check valve device 9 is conditioned, as shown in Fig. 1, the brake valve device 2 being in release position, the brake cylinder 3 is open to the atmosphere through pipe 85, the check valve device 9, straight air pipe and passage 12, a cavity 99 in the rotary valve 17 of the brake valve device 2, and an exhaust port and passage 101. Should the valve 86 of the double check valve device 9 be in its right hand position, the brake cylinder would be open to the atmosphere through pipe 85, check valve device 9, pipe and passage 84, and in the usual manner through the triple valve device 1, it being in the release position thereof, as just described. The position of the valve 86 of the check valve device 9 depends on whether the brake application prior to release has been by automatic or straight air operation, as will hereinafter be made apparent.

When it is desired to start the car, the operator first depresses the pedal 76 of the foot valve device 8, for a reason that will be made apparent hereinafter, then closes circuit breaker 67, and operates the motor controller 65 to power-on position wherein the speed of the car may be varied in the usual manner. The pedal 76 of the foot valve device 8 may now be released, as will be made clear hereinafter, so that the equipment is conditioned as shown in Fig. 1.

*Automatic service*

With the car or cars running along the road, the equipment being conditioned as shown in Fig. 1, if it is desired to effect an automatic service application of the brakes, the pedal 76 of the foot valve device 8 is first depressed, the handle of the motor controller is then released or shifted to power-off position, and finally the desired reduction in brake pipe pressure is made in the usual manner by turning the brake valve handle 18 to service position and after the elapse of the necessary interval, to lap position.

With foot valve pedal 76 depressed, fluid under pressure is supplied from the feed valve device 28 and fluid pressure supply pipe 15, through pipes 93 and 69, to chamber 68 of the foot valve device 8, whence it flows past the unseated valve 72 through chamber 34 to safety control pipe 14, part of the fluid flowing through double check valve 10 and pipe 48 to chamber 47 of the cut-off valve device, and part flowing through the check valve device 31, choke fitting 36, and pipes 35 and 40 to the piston chamber 26 of the application valve device 5 and chamber 33 of the cut-off valve device. The valve piston 49 of the cut-off valve device 6 is immediately raised by the fluid pressure in chamber 47 and the pressure of the fluid thus admitted to chamber 46 urges the diaphragm 45 downwardly to seat the diaphragm 41 on its seat 42.

If desired, the foot valve pedal 76 may be held depressed by the operator while the car is running along the road, but this is not essential, it being necessary only that the pedal 76 be depressed before the motor-controller 65 is conditioned in power-off position.

With the motor-controller in power-off position magnet valve device 7 is energized, but is effective only to vent chamber 38 of the cut-off valve device and pipe 39, past the unseated valve 56 and to cut off the connection between chamber 26 of the application valve device 5 and the fluid pressure supply pipe at the seated valve 57.

It will be observed, therefore, that until the brake valve device is operated to effect a brake application, the car is permitted to coast, in this condition of the equipment.

The reduction in brake pipe pressure effected by opening of the discharge valve 21 of the brake valve device, causes the triple valve device 1 to operate in the usual manner to supply fluid under pressure from the auxiliary reservoir 4 to the brake cylinder 3 to effect a service application of the brakes. The atmospheric communication of the brake cylinder through the straight air pipe 12 and brake valve device 2 is cut off at the seat of the rotary valve 17, as will be apparent from Fig. 2, and the triple valve device 1 closes the usual atmospheric exhaust passage therein for the brake cylinder in the usual manner. When the auxiliary reservoir pressure is reduced to a value slightly below the fluid pressure in the triple valve piston chamber, the triple valve is operated in the usual manner to lap position to cut off the further supply of fluid under pressure from the auxiliary reservoir to the brake cylinder and the brakes are thus held applied in accordance with the attained fluid pressure in the brake cylinder.

An increased degree of braking force in a service application may be obtained by effecting a further reduction in brake pipe pressure in one or more steps, by means of the brake valve device 2, in the usual manner, a full service application being attained when equalization of auxiliary reservoir and brake cylinder pressures occurs.

When the brake cylinder pressure exceeds a predetermined value, the foot valve pedal 76 may be released without unseating the diaphragm 41 of the cut-off valve device 6. Upon the release of the pedal 76 of the foot valve device, chamber 47 is momentarily vented to atmosphere past the unseated diaphragm 79 and through atmospheric passage 82 of the foot valve device 8 but due to the fact that the valve 87 of check valve 10 is automatically shifted to its right-hand position when the pressure of the fluid in the brake cylinder acting through pipe and passage 85, cavity 104 of the slide valve 29 of application valve device 5, and pipe 89, exceeds the reduced pressure in chamber 47, the fluid pressure in chamber 47 is maintained at brake cylinder pressure. Thus, if the brake cylinder pressure exceeds that necessary to maintain valve piston 49 of the cut-off valve device 6 in raised position against the opposing force of spring 50, then the fluid pressure acting on the upper side of diaphragm 45 in chamber 46, maintains diaphragm 41 seated. Consequently the release of pedal 76 of foot valve device 8 is without effect at this time. It will thus be seen that the cut-off valve device 6 is controlled in accordance with either fluid pressure supply pipe, that is, feed valve pressure, or brake cylinder pressure, to nullify the safety control emergency application of the brakes which is produced, as hereinafter described, when the handle of the motor-controller 65 is released and returned to power-off position.

Since the fluid pressure supply pipe 15 is directly connected to the feed valve device at all times, without being under the control of the application valve device 5, adequate pressure to operate the cut-off valve device 6 to prevent a safety control emergency application of the brakes, is at all times available by merely depressing the pedal of the foot valve device 8.

To effect a release of the brakes after an automatic service application thereof, as just described, it is first necessary to depress the pedal 76 of the foot valve device 8, if it has been released, to restore control of the cut-off valve device to fluid pressure supply pipe pressure, and then effect an increase in brake pipe pressure in the usual manner by means of the brake valve device 2. The triple valve device 1 operates in the usual manner in response to an increase in brake pipe pressure to recharge the auxiliary reservoir 4 and to vent the brake cylinder 3 through pipe 85, double check valve 9, pipe 84, and the usual atmospheric exhaust passage in the triple valve device. If the brake pipe pressure is increased to its normal feed valve pressure in one step, a complete release of the brakes is effected, and if the brake pipe pressure is increased in successive steps, a graduated release of the brakes is effected.

Straight air

With the car or cars running along the road, the equipment being conditioned as shown in Fig. 1, a straight air application of the brakes is effected in the usual manner by turning the handle 18 of brake valve device 2 to straight air application position, after first depressing the pedal 76 of the foot valve device 8 and releasing the handle of the motor-controller device 65, as in effecting an automatic service application of the brakes. Depression of the foot valve pedal 76, operates as described in connection with the automatic service application, previously described, to seat the diaphragm 41 of the cut-off valve device 6, to nullify the effect of the return of the motor-controller handle to power-off position and the consequent energization of magnet valve device 7 to unseat valve 56.

With the rotary valve 17 of the brake valve device 2 in straight air application position as indicated in Fig. 2, a communication is established for supplying fluid under pressure from the feed valve device 28 to the brake cylinder 3 by way of the application valve chamber 27, car control pipe 24, rotary valve chamber 16, a port 106 in the rotary valve 17, passage and pipe 12, double check valve 9, and pipe 85, the valve 86 of the check valve device 9 being shifted to its left-hand position, as shown, by the fluid pressure, so that the brake cylinder and atmospheric communication through pipe 84 and the exhaust passage of triple valve device 1 is closed.

When the desired brake cylinder pressure is attained, the brake valve handle 18 is turned to straight air lap position, indicated in Fig. 2, wherein the further supply of fluid under pressure to the brake cylinder is cut off at the seat of the rotary valve 17 of the brake valve device 2.

Brake cylinder pressure may be increased by one operation or a plurality of successive operations of the brake valve handle to straight air application position and to straight air lap position, as just described, a full application being obtained when brake cylinder pressure attains feed valve pressure.

As described above in connection with the automatic service application of the brakes, when the brake cylinder pressure exceeds a predetermined value, upon a straight air application, sufficient to effectively maintain the diaphragm 41 of the cut-off valve device 6 in seated or closed position on its valve seat 42, the foot valve pedal 76 may be released without causing a safety control emergency application of the brakes.

In effecting a release of the brakes after a straight air application thereof, the foot valve pedal 76 must first be depressed, for the same reason as given above in connection with a release of the brakes after an automatic service application of the brakes, in the event that the foot valve pedal 76 has been released, and then the brake valve handle may be turned to release position wherein, as shown in Fig. 1, the cavity 99 of rotary valve 17 connects the straight air pipe 12 to the atmospheric exhaust passage 101, to vent the brake cylinder and thereby release the brakes. Graduated release of the brakes may be obtained in the usual manner.

Automatic emergency

An emergency application of the brakes may be effected by means of the brake valve device 2, in the usual manner, and it is, therefore, deemed unnecessary for present purposes to specifically describe this operation, except to point out that the foot valve pedal 76 must be depressed, for the same reason as given in connection with the automatic service application of the brakes, if it is not held depressed while the car is running along the road, before permitting the motor-controller 65 to be conditioned in power-off position.

Safety control emergency operation

With the car or cars running along the road, the equipment being conditioned as shown in Fig. 1, if the handle of the motor-controller is released intentionally or due to the incapacitation of the operator, the magnet valve device 7 is energized due to the automatic return of the controller to power-off position, and piston chamber 26 of the application valve device is vented to atmosphere through port 61 in the magnet valve device 7, by way of passage and pipe 40, pipe 35, chamber 33 of cut-off valve device 6, past unseated diaphragm 41, through chamber 38, pipe 39, chamber 58 of magnet valve device 7, past unseated valve 56, and through chamber 60. It will be observed that, because chamber 47 of cut-off valve device 6 is open to atmosphere through pipe 48, double check valve 10, pipe 14, past unseated diaphragm 79 of the foot valve device 8, and through exhaust passage 82, chamber 46 of the cut-off valve device is open to atmosphere through passage 51 and, consequently, the diaphragm 41 is unseated and does not prevent flow of fluid under pressure from chamber 26 to the magnet valve device 7.

The higher feed valve pressure acting in valve chamber 27 on the left face of piston 25, shifts the piston 25 to application position, wherein the slide valve 29 laps the car control passage and pipe 24 to cut off the supply of fluid under pressure from the feed valve device 28 to the brake valve device 2 and the brake pipe, and the brake pipe is vented to atmosphere through a cavity 108 in slide valve 29, and an atmospheric exhaust passage 109 opening at the seat of the slide valve 29.

Brake pipe pressure is thus reduced at an emergency rate, and the triple valve device 1 operates, as in the usual manner in response to an emergency rate of reduction in brake pipe pressure, to effect an emergency application of the brakes by supplying fluid under pressure from the auxiliary reservoir 4 to brake cylinder 3 at an emergency rate, through brake cylinder pipe 84, double check valve 9, and pipe 85, valve 86 of check valve 9 being automatically shifted to the right-hand position thereof by the pressure of the fluid supplied through pipe 84, to cut off the brake cylinder atmospheric exhaust through straight air pipe 12 and exhaust passage 101 of the brake valve device 2.

In the application position of the slide valve 29, the passage and pipe 89, connected to the double check valve 10 and opening at the seat of the slide valve 29, is also connected to the atmospheric passage 109 by cavity 108 in slide valve 29, to insure against an undesired release of the brakes after an emergency application of the brakes, which release might be caused by a build-up of fluid pressure in chamber 47 of cut-off valve device 6, due to leakage of fluid under pressure into pipe 89 from valve chamber 27, sufficient to cause diaphragm 41 of the cut-off valve device 6 to operate to close off the atmospheric exhaust of chamber 26 through port 61 of magnet valve device 7. Obviously if the diaphragm 41 seated unintentionally after an emergency application of the brakes, leakage of fluid under pressure from valve chamber 27 past piston 25 into piston chamber 26 might result in undesired return of the application valve device 5 to release position, which would effect operation of the triple valve device 1 to release the brakes.

Release of the brakes, after a safety control emergency application of the brakes, may be effected by depressing the foot valve pedal 76 to seat the diaphragm 79 and unseat valve 72. Fluid under pressure is then supplied directly from the feed valve device 28 and fluid pressure supply pipe 15 into chambers 47 and 46 of cut-off valve device 6, the diaphragm 41 of the cut-off valve device being thus actuated to seated engagement on its seat, as previously described. Fluid under pressure supplied from fluid pressure supply pipe 15 to piston chamber 26 through pipe 14, check valve device 37, choke fitting 36, and pipes 35 and 40, causes piston 25 and slide valve 29 to be returned to release position. The choke fitting 36 is effective to restrict the flow of fluid under pressure to the piston chamber 26 and also chamber 33 of the cut-off valve device 6 to a rate less than that of the flow of fluid under pressure to chambers 47 and 46 of the cut-off valve device, to insure the diaphragm 41 being promptly seated to cut off the exhaust of fluid from pipe 35 through the cut-off valve device 6, and port 61 of the magnet valve device.

When the application slide valve 29 is again in release position, the brake pipe atmospheric exhaust passage 109 is lapped and the car control passage and pipe 24 is uncovered, so that fluid at feed valve pressure is again supplied to the brake valve device 2 and brake pipe 13. Upon the re-charging of the brake pipe, the triple valve device 1 is operated as usual to release the brakes and recharge the auxiliary reservoir.

Summarizing, the present invention comprises fluid pressure brake equipment and an electro-responsive magnet valve device adapted to be energized in the power-off position of the motor-controller of the car to effect a safety control emergency application of the brakes, the motor-controller being adapted to return automatically to power-off position when the handle thereof is released intentionally or due to incapacitation of the operator. A fluid pressure operated cut-off valve device, operatively controlled by either a foot valve device or brake cylinder pressure, is adapted to nullify the effect of energization of the magnet valve device.

While only a single-end control equipment is shown and described, it should be obvious that a double-end equipment may be provided in the usual manner and other modifications, omissions or additions made, without departing from the spirit of the invention. It is not my intention, therefore, to limit the scope of my invention, except as necessitated by the prior art and as defined in the appended claims.

Having now described my invention, what I claim as new and desire to secure by Letters Patent, is:

1. In a fluid pressure brake, in combination, means operable to effect an application of the brakes, electrically operated means adapted upon energization to cause operation of said means, and a car motor-controller having a power-off position, said electrically operated means being energized only in the power-off position of said motor-controller.

2. In a safety car brake, in combination, means operable to effect an application of the brakes, electrically operated means adapted upon energization to cause operation of said means, and a car motor-controller having a power-on and a power-off position and adapted to be conditioned in power-off position upon the release of manually applied pressure, said electrically operated means being energized only in the power-off position of said motor-controller.

3. In a fluid pressure brake, in combination, means operable to effect an application of the brakes, electrically operated means adapted to cause operation of said means, a car motor-controller adapted by operative movement thereof to control said electrically operated means, and fluid pressure actuated means for rendering the operation of said electrically operated means ineffective to cause operation of said means.

4. In a fluid pressure brake, in combination, means operable to effect an application of the brakes, electrically operated means adapted upon energization to cause operation of said means, a car motor-controller having a power-off position, said electrically operated means being energized only in the power-off position of said motor-controller, and fluid pressure actuated means for rendering the energization of said electrically operated means ineffective to cause operation of said means.

5. In a fluid pressure brake, in combination, means operable to effect an application of the brakes, electrically controlled means adapted upon actuation to cause said means to operate to effect an application of the brakes, fluid pressure actuated means adapted upon actuation to render the actuation of said electrically controlled means ineffective to cause operation of said means, and manually operable means for controlling said fluid pressure actuated means.

6. In a fluid pressure brake, in combination, means operable to effect an application of the brakes, electrically operated means adapted upon operation to cause operation of said means, a car motor-controller adapted by operative movement thereof to control said electrically operated means, fluid pressure actuated means adapted upon actuation to render the operation of said electrically operated means ineffective to cause operation of said means, and manually operable means for controlling said fluid pressure actuated means.

7. In a fluid pressure brake, in combination, a brake controlling valve device operable upon an increase in fluid pressure acting thereon to effect the release of the brakes and upon a reduction in fluid pressure acting thereon to effect an application of the brakes, electro-responsive valve means operative to control the supply and release of fluid under pressure to and from said valve device to increase and decrease, respectively, the fluid pressure acting thereon, a car motor-controller having different operating positions, and a switch device controlled in accordance with the position of the motor-controller for controlling the operation of said electro-responsive valve means.

8. In a fluid pressure brake, in combination, a source of fluid under pressure, a fluid pressure operated valve device normally subject to fluid under pressure and adapted upon a reduction in the pressure of the fluid to operate to effect an application of the brakes, electrically controlled means adapted when deenergized to establish a communication through which fluid under pressure from said source is supplied to said valve device and when energized to establish a communication through which fluid under pressure is vented from said valve device, and fluid pressure actuated valve means adapted upon actuation to close both said communications.

9. In a fluid pressure brake, in combination, a source of fluid under pressure, a fluid pressure operated valve device normally subject to fluid under pressure and adapted upon a reduction in the pressure of the fluid to operate to effect an application of the brakes, electrically controlled means adapted when deenergized to establish a communication through which fluid under pressure from said source is supplied to said valve device and when energized to establish a communication through which fluid under pressure is vented from said valve device, fluid pressure actuated valve means adapted upon actuation to close both said communications, and manually operable means adapted to cause fluid under pressure to be supplied to actuate said fluid pressure actuated means, and also to effect the supply of fluid under pressure from said source to said valve device.

10. In a fluid pressure brake, in combination, a brake pipe, a brake cylinder, a source of fluid under pressure, valve means operable upon a reduction in brake pipe pressure to cause fluid under pressure to be supplied to said brake cylinder to effect an application of the brakes, manually operable means for effecting a reduction in brake pipe pressure, an application valve device operable to also effect a reduction in brake pipe pressure, electro-responsive means actuable to cause operation of said valve device, fluid pressure operated means operable to render the actuation of said electro-responsive means ineffective to cause operation of said application valve device, manually operable means for causing fluid under pressure to be supplied from said source to operate said fluid pressure operated means, and means providing communication through which fluid at brake cylinder pressure may also be supplied to said fluid pressure operated means to maintain it in operated condition.

11. In a fluid pressure brake, in combination, a brake pipe, a brake cylinder, a source of fluid under pressure, valve means operable upon a reduction in brake pipe pressure to cause fluid under pressure to be supplied to said brake cylinder to effect an application of the brakes, manually operable means for effecting a reduction in brake pipe pressure, an application valve device operable to also effect a reduction in brake pipe pressure, electro-responsive means actuable to cause operation of said valve device, fluid pressure operated means operable to render the actuation of said electro-responsive means ineffective to cause operation of said application valve device, manually operable means for causing fluid under pressure to be supplied from said source to operate said fluid pressure operated means, and valve means controlled by said application valve device for establishing communication through which fluid at brake cylinder pressure may also be supplied to said fluid pressure operated means to maintain it in operated condition.

12. In a fluid pressure brake, in combination, a brake pipe, a brake cylinder, a source of fluid under pressure, valve means operable upon a reduction in brake pipe pressure to cause fluid under pressure to be supplied to said brake cylinder to effect an application of the brakes, manually operable means for effecting a reduction in brake pipe pressure, an application valve device operable to also effect a reduction in brake pipe pressure, electro-responsive means actuable to cause operation of said valve device, fluid pressure operated means operable to render the actuation of said electro-responsive means ineffective to cause operation of said application valve device, manually operable valve means adapted to establish a communication through which fluid under pressure is supplied from said source to operate said fluid pressure operated means, valve means controlled by said application valve device for establishing communication through which fluid at brake cylinder pressure may also be supplied to said fluid pressure operated means to maintain it in operated condition, and double check valve means adapted to open one of said communications as it closes the other.

13. In a fluid pressure brake, in combination, fluid pressure operated valve means operably responsive to variations in fluid pressure acting thereon to effect the application and release of the brakes, means providing a communication through which fluid under pressure is supplied to and released from said valve means to effect its operation, a valve device including a valve operable to close said communication and fluid pressure operated means for operating said valve, and manually operable valve means adapted to establish a communication through which fluid under pressure is supplied to said fluid pressure operated means to operate said valve of the valve device, and also to establish a communication through which fluid under pressure is supplied to said valve means, said last communication being adapted to restrict the flow of fluid under pressure therethrough to a rate less than that of the fluid under pressure through said second mentioned communication.

14. In a fluid pressure brake, in combination, a source of fluid under pressure, a fluid pressure operated valve means normally subject to fluid under pressure supplied from said source and adapted upon a reduction in the pressure of the fluid to which it is subjected to effect an application of the brakes, means providing two parallel communications for supplying fluid under pressure from said source to said valve means, means adapted to close one of said communications when the other of the said communications is opened, and check valve means in the other of said communications for preventing back flow of fluid under pressure therethrough from said valve means when said one communication is open.

15. In a fluid pressure brake, in combination, a brake pipe, a brake controlling valve device operable upon a reduction in brake pipe pressure to effect an application of the brakes and upon an increase in brake pipe pressure to effect the release of the brakes, a brake valve device adapted in one position to establish a communication through which fluid under pressure is supplied to charge the brake pipe and in another position to close said communication and vent the brake pipe, a supply pipe constantly charged with fluid under pressure, an application valve device normally subject to fluid under pressure supplied from said supply pipe and effective upon a reduction in the pressure of the fluid to which it is subjected to vent the brake pipe, and means controlled by said application valve device for closing the said charging communication for the brake pipe when the application valve device is effective to vent the brake pipe.

16. In a fluid pressure brake, in combination, a brake controlling valve device operable upon a variation in fluid pressure acting thereon to effect an application of the brakes, electrically operated means operable to cause variation in the fluid pressure acting on the valve device for effecting operation of said valve device, and a car-motor controller adapted by operative movement thereof to control said electrically operated means.

17. In a fluid pressure brake, in combination, means operable to effect an application of the brakes, electrically controlled means adapted upon actuation to cause said means to operate to effect an application of the brakes, fluid pressure actuated means adapted upon actuation to render the actuation of said electrically controlled means ineffective to cause operation of said means, and manually operable means for controlling the supply of fluid under pressure to said fluid pressure actuated means for effecting actuation thereof.

18. In combination, a normally closed circuit for supplying power to the driving motor of a vehicle, a control device having a power-off position in which it effects the opening of said circuit and a power-on position in which it effects the closing of said circuit, a normally open circuit, electro-responsive means operating on said normally open circuit and adapted upon energization occasioned as a result of closure of said normally open circuit to effect application of the brakes, said control device being effective in its power-off position to effect closing of said normally open circuit, and circuit controlling means adapted to simultaneously interrupt both of said circuits.

JOHN F. CRAIG.